United States Patent [19]

Hollinger

[11] Patent Number: 4,908,744
[45] Date of Patent: Mar. 13, 1990

[54] FREQUENCY-INDEPENDENT SINGLE-PHASE TO THREE-PHASE AC POWER CONVERSION

[75] Inventor: Theodore G. Hollinger, Redmond, Oreg.

[73] Assignee: APC-Onsite, Inc., Redmond, Oreg.

[21] Appl. No.: 353,379

[22] Filed: May 10, 1989

[51] Int. Cl.$^4$ .............................................. H02M 5/00
[52] U.S. Cl. ........................................ 363/4; 363/36; 363/148
[58] Field of Search ................... 363/2, 4, 10, 36, 148, 363/149, 154, 132

[56] References Cited

U.S. PATENT DOCUMENTS 4,618,809  10/1986  Maeda ................................ 363/148
4,644,241  2/1987  Mazda ................................ 363/36

FOREIGN PATENT DOCUMENTS 0076167  5/1984  Japan ................................ 363/148

OTHER PUBLICATIONS

Dewan, "A Novel Static Single-to-Three-Phase Converter", IEEE Transactions on Magnetics, vol. MAG-17, No. 6, Nov. 1981, pp. 3287–3289.

Primary Examiner—Peter S. Wong
Attorney, Agent, or Firm—Kolisch, Hartwell & Dickinson

[57] ABSTRACT

Three-phase power-conversion wherein the frequency output voltage is independent of the frequency of input voltage. One of three input terminals in a load powered by the apparatus is directly grounded. Each of the other two input terminals is supplied a sinusoidal voltage artifact from an appropriate transform circuit which is driven by a microprocessor, with one of these artifacts having a form $1.73\alpha\sin A$, and the other having the form of $1.73\alpha\sin(A+60°)$, where $\alpha$ is the nominal amplitude of the source voltage and the Expressions A and $(A+60°)$ are the respective phase angles. Operation of the microprocessor controls output frequency.

8 Claims, 1 Drawing Sheet (PHASE 1)  A → 0
(PHASE 2)  B → 1.73 α sin A
(PHASE 3)  C → 1.73 α sin(A+60°)

(PHASE1) A → 0
(PHASE2) B → 1.73 α sin A
(PHASE3) C → 1.73 α sin(A+60°)

FREQUENCY-INDEPENDENT SINGLE-PHASE TO THREE-PHASE AC POWER CONVERSION

BACKGROUND AND SUMMARY OF THE INVENTION

This invention pertains to power conversion apparatus, and in particular, to apparatus which enables the conversion of DC power or single-phase AC power to three-phase AC power. More specifically, it pertains to such a system wherein the AC frequency supplied to a three-phase load is independent of the frequency available from the DC or single-phase AC source, and is selectively variable.

There are many circumstances where it is required, or at least desired, to operate a three-phase load, such as a three-phase motor, in a facility where only, for example, conventional, 120-volt, single-phase power is available, or, where a DC power supply is the only power source. Further, there are many applications where, in addition, it is desired to supply a three-phase load with a selectively variable-frequency voltage (independent of the source frequency) for the purpose (in the case of a motor load) of enabling variable-speed control.

Conversion circuitry which has been proposed in the past to accomplish the task of driving such a load from such a source is typically quite complex and expensive, in that it usually employs a large number of relatively expensive power switches (switching transistors) to accomplish the required conversion. In most cases, six such switches are employed.

An important object of the present invention is to provide apparatus which is capable of performing the kind of conversion just mentioned and which employs a minimum number (no more than four) of such switches.

A related object is to provide such apparatus which is distinguished by relatively simple circuitry and relatively low cost.

Yet another object of the invention is to provide apparatus of the type generally outlined which is capable of supplying a voltage output having a variable frequency—completely independent of the frequency of the source voltage.

The surprising capability of the apparatus of the invention to meet these objectives results from the recognition that one of the input terminals in a selected three-phase load can be directly grounded, with each of the two other output terminals supplied, under computer control, a sinusoidal voltage artifact each having a common selectively variable frequency which is totally independent of the source frequency. The circuitry employed in supplying each of these two voltage artifacts requires only two power switches for each artifact.

Various other objects and advantages which are attained by the invention will become more fully apparent as the description which now follows is read in conjunction with the accompanying drawings.

DETAILED DESCRIPTION OF THE INVENTION

In Expression I set forth immediately below, the voltage conditions required for each of the three input terminals (phases) in a three-phase load are expressed:

Expression I:

Phase $1 = \alpha \sin A$

Phase $2 = \alpha \sin (A + 120°)$

Phase $3 = \alpha \sin (A + 240°)$

Subtracting Phase 1 from all the phases in this expression yields Expression II.

Expression II:

Phase $1 = \alpha \sin A - \alpha \sin A$

Phase $2 = \alpha \sin (A + 120°) - \alpha \sin A$

Phase $3 = \alpha \sin (A + 240°) - \alpha \sin A$

Expanding Expression II gives:

Expression III:

Phase $1 = 0$

Phase $2 = \alpha(\sin A \cdot \cos 120° - \cos A \cdot \sin 120°) - \alpha \sin A$ Phase $3 = \alpha(\sin A \cdot \cos 240° - \cos A \cdot \sin 240°) - \alpha \sin A$ An evaluation of this yields:

Expression IV:

Phase $1 = 0$

Phase $2 = \alpha(-1.5 \sin A - 0.866 \cos A)$

Phase $3 = \alpha(-1.5 \sin A + 0.866 \cos A)$

Reduction then leads to:

Expression V:

Phase $1 = 0$

Phase $2 = 1.73\alpha \sin (A - 30°)$

Phase $3 = 1.73\alpha \sin (A + 30°)$

Shifting all phases by $+30°$ gives:

Expression VI:

Phase $1 = 0$

Phase $2 = 1.73\alpha \sin A$

Phase $3 = 1.73\alpha \sin (A + 60°)$

With these mathematical transformations performed, and the new equivalency seen, one recognizes immediately that one input terminal in a three-phase load can be directly grounded, with high-speed power switching required only for the supplying of voltage artifacts to the other two input terminals.

Figure 1:
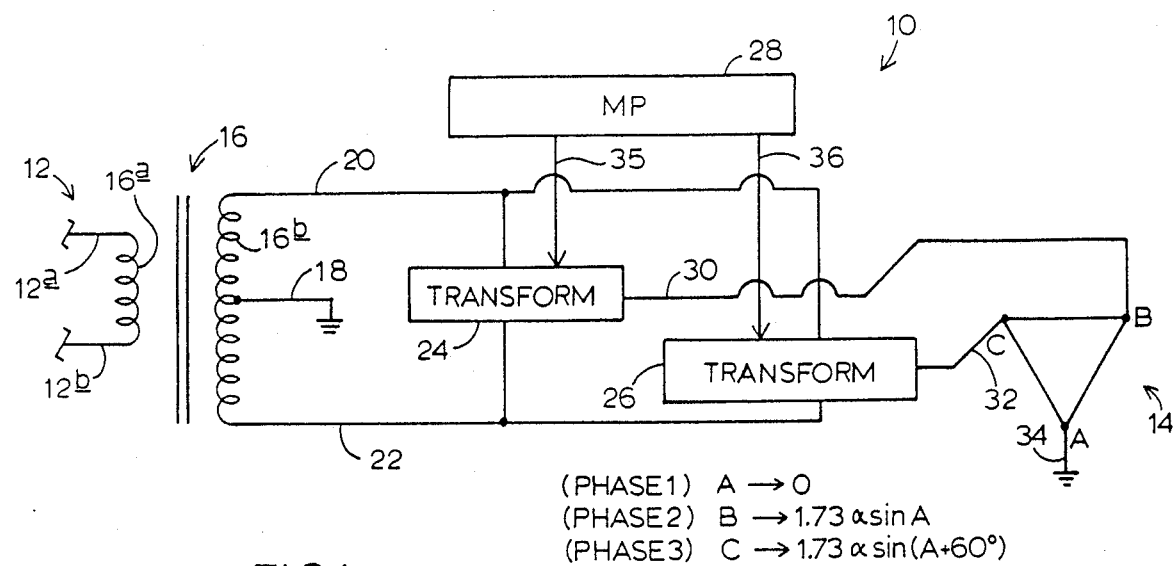
FIG. 1 is a simplified block diagram illustrating the conversion apparatus of the present invention.

Turning attention now to FIG. 1, the system, or apparatus, of the invention is shown generally within dashed block 10.

Indicated at 12, and for purposes of illustration, is a conventional 120-volt single-phase source characterized by the conventional operating frequency of 60-Hz, and including a pair of output terminals shown at 12a, 12b. It should be appreciated that the power source for system 10 may be a DC or AC power supply. So long as there is sufficient power available at the source to provide a final output of 680 volts, the power source is adequate, and the nature of the wave form at the source is immaterial. Therefore, as used herein, the frequency at the source can be any frequency, including zero in the case of DC power.

At the far right side of FIG. 1, shown generally at 14, is a conventional three-phase motor (load) including three input terminals shown at A, B, C.

The source output terminals are connected to the primary winding 16a of a voltage-doubling step-up transformer 16 whose secondary winding 16b is center-tapped and grounded at 18. The opposite ends of winding 16b are connected to conductors 20, 22.

The voltage across primary winding 16a takes the form of $\alpha$ Sin A, with $\alpha$ representing the nominal amplitude herein of about 120-volts, and with A representing the phase angle. With secondary winding 16b center-tapped and grounded as shown, the voltage on conductor 20 takes the form of $+\alpha$ Sin A, and that on conductor 22 takes the form of $-\alpha$ Sin A.

Included in system 10, as shown in FIG. 1 in block form, are two structurally identical transform circuits 24, 26, and a microprocessor, or computer, or algorithm-controlled computer means, 28. Speaking in general terms, each transform circuit is connected as shown to conductors 20, 22 which supply operating power, as will be explained. Circuit 24 is also connected by a conductor 30 to motor input terminal B, and circuit 26 is connected by a conductor 32 to motor input terminal C. On conductor 30, circuit 24 supplies, as will be explained shortly, a sinusoidal voltage artifact in the form of $1.73\alpha$ Sin A, and circuit 26 supplies on conductor 32 a sinusoidal voltage artifact in the form of $1.73\alpha$ Sin $(A+60°)$.

Motor input terminal A is grounded at 34.

Completing a description of FIG. 1, via a cable 35, the microprocessor operates the two-only high-speed transistor power switches which, as will be explained, form part of circuit 24. Similarly, via a cable 36, the microprocessor operates the two-only, high-speed transistor power switches which form part of circuit 26.

With the system shown in FIG. 1 in operation, the forms of the voltages which are applied to the three motor input terminals are indicated at the lower right-hand side of FIG. 1.

Figure 2:
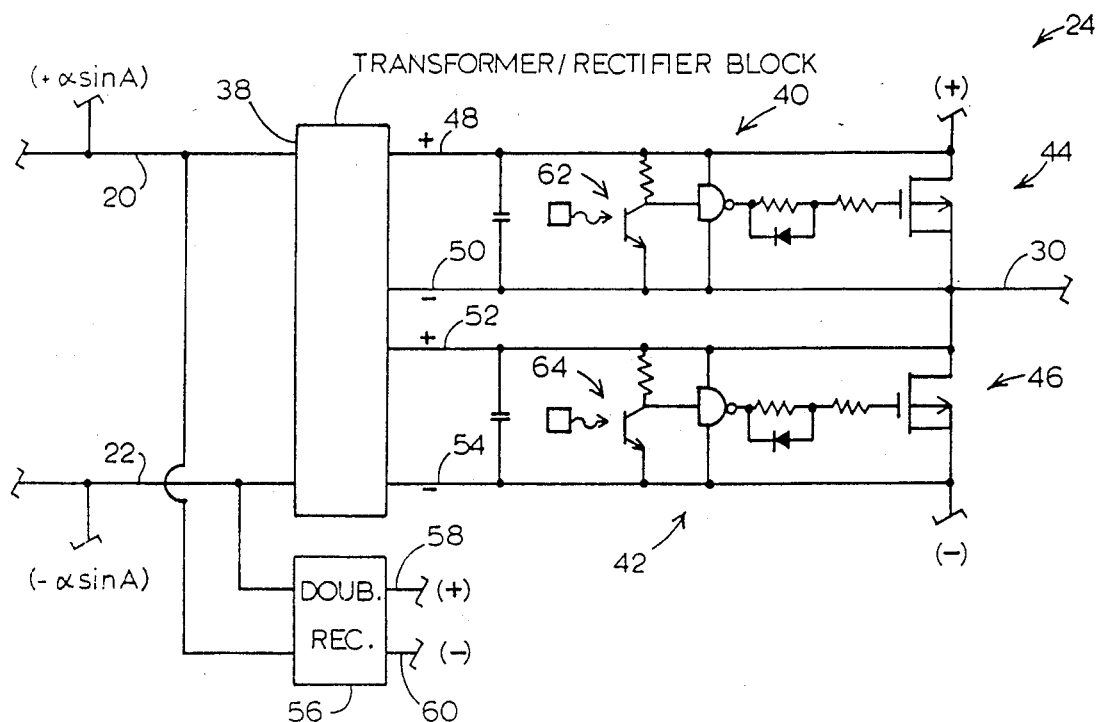
FIG. 2 is a more detailed diagram illustrating the construction of the two blocks (identical) in FIG. 1 identified by the term "TRANSFORM".

Switching attention now to FIG. 2, here details of transform circuit 24 are illustrated. As has already been mentioned, transform circuit 26, internally, is identical to transform circuit 24.

Included in circuit 24 are a conventional transformer/rectifier block 38, the input side of which is connected to previously mentioned conductors 20, 22 (see the $+\alpha$ Sin A and the $-\alpha$ Sin A indicators on the left side of FIG. 2), with the output side connected to two conventional driver circuits, 40, 42 which drive the two-only power-switching transistors 44, 46, respectively, included in circuit 24.

Within block 38, voltage supplied from conductors 20, 22 is suitably transformed and rectified to provide, on associated pairs of output conductors 48, 50 and 52, 54, suitable DC sources for energizing driver circuits 40, 42, respectively.

Further included in circuit 24 is a conventional voltage doubler and rectifier 56 which connects to previously mentioned conductors 20, 22. DC output from this unit is supplied on conductors 58, 60.

As was mentioned earlier, driver circuits 40, 42, which are duplicates of one another, are entirely conventional in construction, with each including a conventional optical transistor, such transistors being shown at 62, 64. Though not shown in FIG. 2, transistors 62, 64 are coupled to microprocessor 28 via previously mentioned cable 35. Signals supplied respectively to these transistors by the microprocessor cause them to open and close in accordance with the manner in which the microprocessor has been programmed to operate. Such operation drives switches 44, 46 appropriately.

At the right side of FIG. 2, near the top and bottom thereof, are shown upwardly and downwardly extending fragmented conductors with plus and minus signs next to them. The one marked with plus sign is connected to conductor 58, and the one marked with the minus sign is connected to connector 60. Thus, applied between these two conductors is a DC voltage with a nominal amplitude of 680-volts.

The point of connection between transistors 44, 46 connects with previously mentioned conductor 30.

Microprocessor 28 is programmed to switch transistors 44, 46 on and off at a rate to establish, on conductor 30, a sinusoidal voltage artifact with any selected frequency, such as the widely used frequency of 60-Hz. With the DC-doubled voltage available across the two transistors collectively, the microprocessor employs conventional pulse-width modulation during switching of each of the transistors to produce, on conductor 30, at the selected frequency, a voltage having the form of $1.73\alpha$ Sin A. The algorithm required to produce this kind of activity is entirely conventional and well within the skill and understanding of those skilled in the art. Accordingly, no details of such an algorithm are expressed herein.

With respect to transform circuit 26, the microprocessor is suitably programmed to drive the two-only power transistor switches in this transform circuit in a manner producing on conductor 32, at the selected operating frequency, a sinusoidal voltage artifact having the form of $1.73\alpha$ Sin $(A+60°)$.

The elegant simplicity of the apparatus proposed by the present invention should thus now be very apparent. High-speed power switching is required for only two of the three input terminals in a three-phase load, and as a consequence, a total of only four power switching transistors is necessary. The third input terminal in the load is simply directly grounded.

Frequency independence of the input terminals in the load from the output terminals of the source allows for variable selective programming of the microprocessor to produce a variable output frequency, thus to allow, for example, for convenient motor speed control.

The proposed invention, therefore, enables one easily, and at a relatively low cost, and with simplicity, to handle three-phase AC loads with power derived from the usual readily available single-phase AC source, or from a DC source, with complete frequency independence between the two. The initial power source supplies power, which is converted to DC in the system. A desired-frequency sine wave is then reestablished with the proper phase angle and amplitude as an output power supply.

The various objects and advantages which are attained by the invention have thus been expressed. Variations and modifications in the specific implementation of the invention shown herein may be made, of course, without departing from the spirit of the invention.

It is claimed and desired to secure as Letters Patent:

1. Apparatus for supplying to a three-phase electrical load including first, second and third input terminals, operating power from a power source including two output terminals, comprising algorithm-controlled computer means, first transform means operatively connected to said computer means, to such two output terminals, and to the first of such input terminals, for deriving power from the output terminals and for supplying to the first input terminal, under the control of said computer means, a sinusoidal voltage artifact having the form of $1.73\alpha \sin A$, where $\alpha$ is the amplitude of the voltage, and A is the phase angle, second transform means operatively connected to said computer means, to such two output terminals, and to the second of such input terminals, for deriving power from the two output terminals and for supplying to such second input terminal, under the control of said computer means, a sinusoidal voltage artifact having the form of $1.73\alpha \sin (A+60°)$, and ground means grounding the load's third input terminal.

2. The apparatus of claim 1, wherein each of said transform means includes no more than two electronic power switches operatively connected to and controlled by said computer means.

3. The apparatus of claims 1 or 2, wherein the frequencies of such voltage artifacts are the same as one another, and are independent of the frequency of voltage supplied by the source.

4. The apparatus of claim 3, wherein the frequencies of artifacts are variable under the control of said computer means.

5. Apparatus for supplying to a three-phase electrical load including three input terminals, operating power from a single-phase sinusoidal power source, having two output terminals, which source supplies a voltage in the form of $\alpha \sin A$, where $\alpha$ is the amplitude of the voltage, and A is the phase angle, said apparatus, in operative condition, comprising algorithm-controlled computer means, first transform means operatively connected to said computer means, to such two output terminals, and to one of such input terminals, for deriving power from the output terminals and for supplying to the one input terminal, under the control of said compute means, s sinusoidal voltage artifact having the form of $1.73\alpha \sin A$, second transform means operatively connected to said computer means, to such two output terminals, and to another one of such input terminals, for deriving power from the two output terminals and for supplying to such other input terminal, under the control of said computer means, a sinusoidal voltage artifact having the form of $1.73\alpha \sin (A+60°)$, and ground means grounding the load's third input terminal.

6. The apparatus of claim 5, wherein each of said transform means includes no more than two electronic power switches operatively connected to and controlled by said computer means.

7. The apparatus of claims 5 or 6, wherein the frequencies of such voltage artifacts are the same as one another, and are independent of the frequency of voltage supplied by the source.

8. The apparatus of claim 7, wherein the frequencies of artifacts are variable under the control of said computer means.

* * * * *